July 15, 1930.　　　　G. FERGUSON　　　　1,770,607
ABSORPTION REFRIGERATING MACHINE
Filed July 20, 1928　　　2 Sheets-Sheet 2
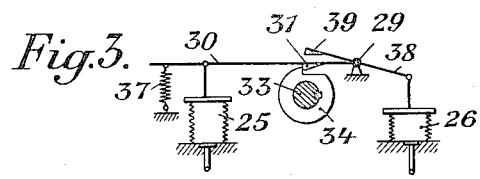
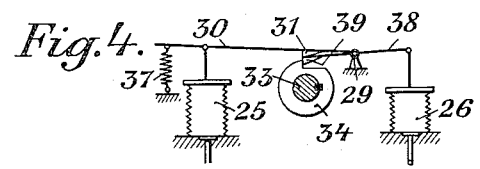
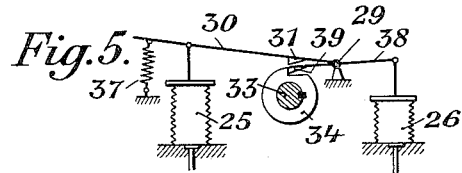
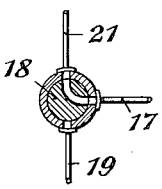
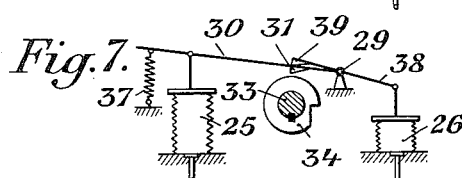
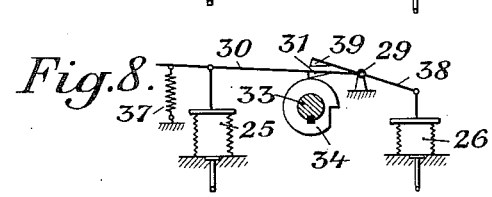
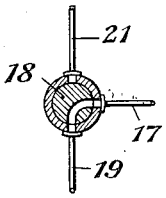
INVENTOR:
george Ferguson
BY
Pennie Davis Marvin + Edmonds
ATTORNEYS Patented July 15, 1930

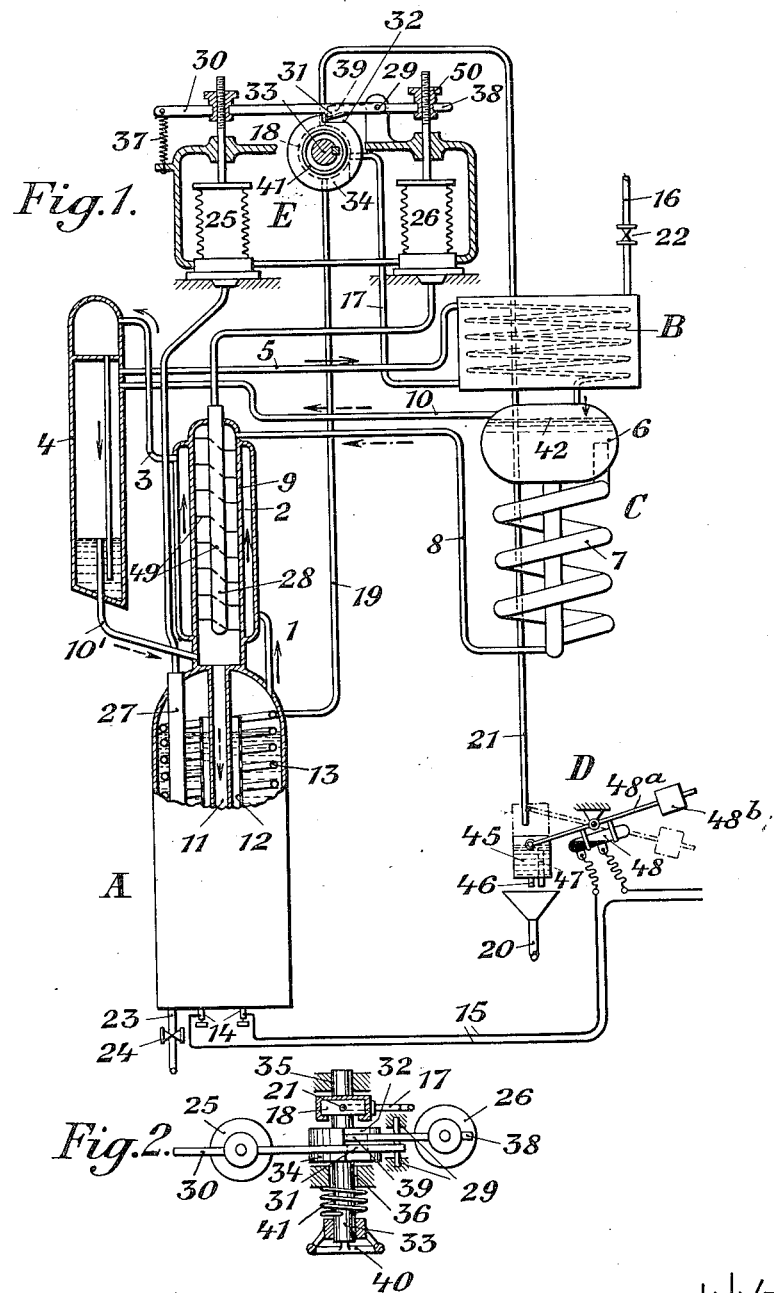

1,770,607

UNITED STATES PATENT OFFICE

GEORGE FERGUSON, OF WINTERTHUR, SWITZERLAND, ASSIGNOR TO THE FIRM OF SULZER FRÈRES SOCIÉTÉ ANONYME, OF WINTERTHUR, SWITZERLAND

ABSORPTION REFRIGERATING MACHINE

Application filed July 20, 1928, Serial No. 294,199, and in Switzerland August 11, 1927.

This invention relates to absorption refrigerating machines especially of the intermittently operating type. Hitherto in such machines it has been proposed to shut off the supply of heat to the generator-absorber either by means of a thermostat operating under the influence of the temperature in the generator-absorber or in some cases by a mechanical device set beforehand to operate after a certain time.

With both these arrangements the quantity of refrigerant vapour expelled from solution varies in accordance with external conditions, e. g. it is smaller when the cooling water temperature is high than when it is low, i. e., with a higher cooling water temperature and consequently a higher back pressure in the machine, a higher temperature in the generator-absorber or a longer generating period is necessary in order to expel a fixed charge than is the case with a lower cooling water temperature. The present invention has for its object to provide a construction of absorption refrigerating machine in which these disadvantages are obviated.

To this end in an intermittently operating absorption refrigerating machine according to the present invention the supply of heat to the generator-absorber is automatically shut off by a device which depends for its operation on the quantity of refrigerant expelled from solution. Preferably this device acts upon the valve controlling the supply of cooling medium to the cooling coil of the generator-absorber, the arrangement being such that the heat supply is shut off in consequence of the operation of this valve.

The operation of the device for shutting off the supply of heat is preferably brought about by a thermostat influenced by cool refrigerant flowing over from the evaporator after it has been filled, this thermostat being conveniently disposed within a vessel connected to the generator-absorber and surrounded by a jacket through which pass the hot gases expelled in the generator-absorber. During the generating period the thermostat acts upon a locking device to hold the control valve in such a position as to cause the cooling medium to flow directly to waste without passing through the generator-absorber, the arrangement being such that the flow of cooling medium to waste maintains the switch for the heating current in the closed position. After a predetermined quantity of expelled refrigerant has collected in the evaporator the cool refrigerant overflows and acts upon the thermostat so as to cause it to release the locking device, a spring or like device being provided whereby, when the lock is released, the valve is turned into a position in which the cooling medium flows through the cooling coil of the generator-absorber.

It will be understood that the valve is only held locked so long as the thermostat is exposed to the influence of the hot gases passing out of the generator-absorber. Hence at the beginning of a generating period, when the thermostat is cold, the valve cannot be locked and it is therefore necessary to provide an auxiliary lock to hold the valve in position while the thermostat influenced by the overflowing refrigerant is heating up. This auxiliary lock is released preferably when a second thermostat exposed to the temperature within the generator-absorber becomes hot. It will thus be seen that the device for shutting off the heat supply to the generator-absorber is controlled by two thermostats, while the locking device is only operative to lock the cooling medium control valve when both thermostats are exposed to heat or both exposed to cold.

The invention may be carried out in various ways but one construction according thereto is illustrated diagrammatically by way of example in the accompanying drawings in which Figure 1 shows an intermittently operating absorption refrigerating machine, Figure 2 illustrates the locking device for the cooling medium control valve, Figures 3–5 illustrate the position of the locking device, and Figure 6 of the cooling medium control valve during the generating period, Figures 7 and 8 show the position of the locking device, and Figure 9 of the cooling medium control valve during the absorption period.

In the construction illustrated in the drawings the machine comprises a generator-absorber A, a condenser B and an evaporator C. The delivery pipe 1 for expelled refrigerant gas passes from the generator-absorber A into a jacket 2 from which a pipe 3 leads into a vessel 4. This vessel 4, which contains a solution of the refrigerant and serves as a rectifier and also as a control device, is connected to the condenser B through a pipe 5. During the generating period the expelled gas passes through the liquid in the vessel 4 and is thereby rectified, while during absorption the liquid prevents the gas from returning through the pipes 3 and 1 and causes it to enter the generator-absorber through the pipe $10^1$.

The condenser coil B leads into the evaporator C which comprises a relatively large upper collecting vessel 6 and a refrigerating coil 7 of which the lowermost point is connected through an overflow pipe 8 to the upper part of a vessel 9 disposed above the generator-absorber A. The absorption pipe 10 leads from the collecting vessel 6 of the evaporator to the vessel 4 and communicates through this vessel and a pipe $10^1$ with the lower part of the vessel 9, the end 11 of which passes into a tube 12 surrounding it within the generator-absorber and provided with circulation orifices as shown. The cooling coil 13 of the generator-absorber surrounds this tube 12 and the heating device (not shown) is connected to terminals 14 which are supplied with electric current through conductors 15.

The current for the heating device is controlled by a device D comprising a mercury switch 48 carried on a pivoted lever $48^a$ having a tip vessel 45 mounted at one end and a counterweight $48^b$ at the other. This switch device is operated by the stream of cooling water flowing through the pipe 21 and controlled by a device E of which the construction and operation will be described later. The vessel 45 is provided with a small outlet 46 and an overflow 47 so that, the opening 46 being too small to let all the water pass, as long as the water continues to flow through the pipe 21 the vessel 45 remains full and the switch is closed so that the heating device remains in operation. When, however, the flow of water through the pipe 21 ceases, the vessel 45 empties and the counterweight $48^b$ moves the switch arm into the chain line position thus shutting off the heat supply.

The control device E for the switch D comprises a valve or cock 18 serving to connect the pipe 17 conveying cooling water from the condenser B either to a pipe 19 leading to the cooling coil 13 of the generator-absorber, or to the pipe 21 leading through the tip-vessel 45 to the waste pipe 20. The valve 18 is acted upon by a spring 41 normally tending to hold it in a position in which it connects the pipes 17 and 19. By means of the locking device about to be described however, the valve 18 may be maintained in a position in which it connects the pipes 17 and 21.

This locking device comprises a thermostat 28 disposed within the vessel 9 and acting upon a diaphragm 26 operatively connected to a lever 38 pivoted at 29 and carrying a pawl 39. This pawl is adapted to engage with a notch 32 formed in a disc 34 keyed to the valve spindle 33 which is mounted in bearings 35, 36 (Figure 2).

The object of the pawl 39 is to hold the valve 18 in the position shown in Figure 6 during the generating period. At the beginning of the generating period, however, the thermostat 28 is cold and the diaphragm 26 has consequently contracted to such an extent that the pawl 39 is raised clear of the notch 32 and cannot therefore lock the valve 18 in the desired position. In order therefore that the valve 18 may be locked at the beginning of the generating period, a second pawl 31 is provided carried on a lever 30 also pivoted at 29 and operated by a diaphragm 25 acted upon by an auxiliary thermostat 27 disposed within the generator-absorber. A spring 37 is provided tending to draw the pawl 31 down against the periphery of the disc 34. It will be observed that while the lever 38 is pivoted between its ends, the lever 30 is pivoted at one end so that expansion of the diaphragm 26 causes the pawl 39 to engage with the notch 32 while expansion of the diaphragm 25 causes the pawl 31 to move clear of the notch.

The operation of the apparatus is as follows:

To initiate a generating period the valve 18 is turned into the position shown in Figure 6 by means of a hand-wheel 40 (Figure 2) or by other, i. e. automatically operated means if desired. Since both thermostats are cold at the beginning of the generating period, both the diaphragms 25 and 26 will have contracted, for example as shown in Figure 3, and the spring 37 will therefore pull the pawl 31 into the notch 32 so as to lock the valve 18 in the position shown in Figure 6. At the same time the pawl 39 will be raised clear of the periphery of the disc 34, the positions of the two pawls being as shown in Figure 3.

With the valve 18 in this position the cooling water from the condenser flows through the pipe 17 and the valve 18 into the pipe 21 and thence to the tip-vessel 45 which fills up and tips into the position shown in full lines in Figure 1, thus closing the heating current circuit for the generator-absorber. As the contents of the generator-absorber heat up, refrigerant gas is expelled and passes out through the pipe 1 into the jacket 2 thus heating up the thermostat 28. The increased temperature of the thermostat 28 causes the diaphragm 26 to expand and actuate the lever 38 so as to cause the pawl 39 to engage with the notch 32. At the same time the thermostat 27 becomes hot and causes the diaphragm 25 to expand and raise the lever 30 until the pawl 31 comes out of the notch 32, the arrangement being such that the pawl 39 engages with the notch 32 before the pawl 31 is disengaged therefrom. (See Figures 4 and 5.)

The refrigerant expelled from solution in the generator-absorber after being cooled and condensed collects in the evaporator and in the vessel 6 disposed above it, and on reaching the level 42 overflows through the pipe 8 into the vessel 9 containing the thermostat 28. Within the vessel 9 and surrounding the thermostat 28 is disposed a conducting device 49 for the purpose of exposing the thermostat as much as possible to the cool liquid refrigerant overflowing from the evaporator. The excess of liquid refrigerant in the evaporator flows through the vessel 9 into the generator-absorber and reduces the temperature of the thermostat 28, thus causing the diaphragm 26 to contract and disengage the pawl 39 (see Figure 7) so that the control valve is rotated by the spring 41 into the position shown in Figure 9. The pipe 17 is now disconnected from the pipe 21 and connected to the pipe 19 so that the cooling water flows into the cooling coil 13 within the generator-absorber.

At the same time the tip-vessel 45 empties owing to the cessation of the flow of water through the pipe 21, and tips into the chain line position, thus breaking the circuit for the heating current and shutting off the heat supply to the generator-absorber.

In the generator-absorber the absorption period begins and the thermostat 27 cools down, causing the diaphragm 25 to contract and bring the pawl 31 into the position shown in Figure 8, so that when the hand-wheel 30 is turned to initiate a new generating period the pawl 31 drops into the notch 32 under the action of the spring 37 and locks the valve 18 in the desired position. The operation of the apparatus is then repeated as described above.

An adjusting nut 50 is provided between the diaphragm 26 and the lever 38 whereby the time at which the pawl 39 is disengaged from the notch 32 may be varied. For example the disc 34 may be released a few seconds after the refrigerant has commenced to overflow from the evaporator, or on the other hand, the nut 50 may be adjusted so that the disc is not released until some minutes have elapsed. Thus if it is desired to increase the purity of the refrigerant in the evaporator the overflow may be allowed to continue for some time in order to remove as much water containing refrigerant gathered at the bottom of the evaporator as possible

I claim:—

1. In an intermittently operating absorption refrigerating machine including a generator-absorber and an evaporator, control mechanism for controlling the supply of heat to said generator-absorber, said mechanism including an overflow conduit disposed between said evaporator and said generator-absorber and a heat sensitive device arranged to be acted upon by the cool refrigerant flowing through said overflow, said device being adapted to shut off the heat supply to the generator-absorber on the overflow of the refrigerant from said evaporator at the end of the generating period.

2. Apparatus as set forth in claim 1, characterized by the provision of a valve for controlling the supply of cooling medium to the generator-absorber, the heat sensitive device being operatively connected to said valve and arranged to shut off the supply of heat only after said valve has been opened to admit cooling medium to the generator-absorber.

3. Apparatus as set forth in claim 1, characterized by the provision of a vessel connected to the generator-absorber, the heat sensitive device being disposed in said vessel.

4. Apparatus as set forth in claim 1, characterized by the provision of control mechanism including a vessel connected to the generator-absorber, a thermostat disposed in said vessel, and a jacket surrounding said vessel and adapted to receive the hot gases expelled from the generator-absorber.

5. Apparatus as set forth in claim 1, characterized by the provision of a valve adapted in one position to supply cooling medium to the generator-absorber and in another position to direct the cooling medium to waste, and control mechanism including a locking device for said valve, thermostatic means controlling said locking device, and means governed by the flow of cooling medium to waste for controlling the supply of heat to the generator-absorber.

6. Apparatus as set forth in claim 1, characterized by the provision of a valve adapted in one position to supply cooling medium to the generator-absorber and in another position to direct the cooling medium to waste, and control mechanism including a locking device adapted to lock said valve in said second named position, a spring adapted to return said valve to said first named position when said locking device is released, and thermostatic means controlling said locking device, said thermostatic means being operatively connected to said locking device and arranged to effect release thereof when a predetermined quantity of refrigerant has been collected in the evaporator.

7. Apparatus as set forth in claim 1, characterized by the provision of a valve adapted in one position to supply cooling medium to the generator-absorber and in another position to direct the cooling medium to waste, and control mechanism including a main locking device adapted to lock said valve in said second named position, thermostatic means controlling said locking device, said thermostatic means being adapted to hold said lock in engagement with said valve during the major portion of the generating period, a subsidiary locking device adapted to lock said valve in said second named position, and thermostatic means controlling said subsidiary locking device, said second named thermostatic means being adapted to release said subsidiary locking device after a predetermined initial portion of the generating period has elapsed.

8. Apparatus as set forth in claim 1, characterized by the provision of a heat sensitive device comprising a thermostat adapted to be influenced by the cool refrigerant discharged from the evaporator, and a second thermostat adapted to be influenced by the temperature within the generator-absorber.

9. Apparatus as set forth in claim 1, characterized by the provision of control mechanism including a thermostat adapted to be influenced by the cool refrigerant discharged from the evaporator and a second thermostat adapted to be influenced by the temperature within the generator-absorber, said thermostats each being provided with a collapsible diaphragm and so arranged that the supply of heat to the generator-absorber is shut off only when the diaphragm associated with said first named thermostat is contracted and the diaphragm associated with said second named thermostat is expanded.

10. Apparatus as set forth in claim 1, characterized by the provision of a valve adapted in one position to supply cooling medium to the generator-absorber and in another position to direct the cooling medium to waste, and control mechanism including a locking device adapted to lock said valve in said second named position, and two thermostats controlling said locking device, said thermostats being adapted to hold said device in said locked position when both thermostats are exposed to the same condition of temperature.

In testimony whereof I have affixed my signature.

GEORGE FERGUSON.